J. C. HUFMAN.
TOASTER.
APPLICATION FILED MAR. 13, 1909.
935,510.
Patented Sept. 28, 1909.
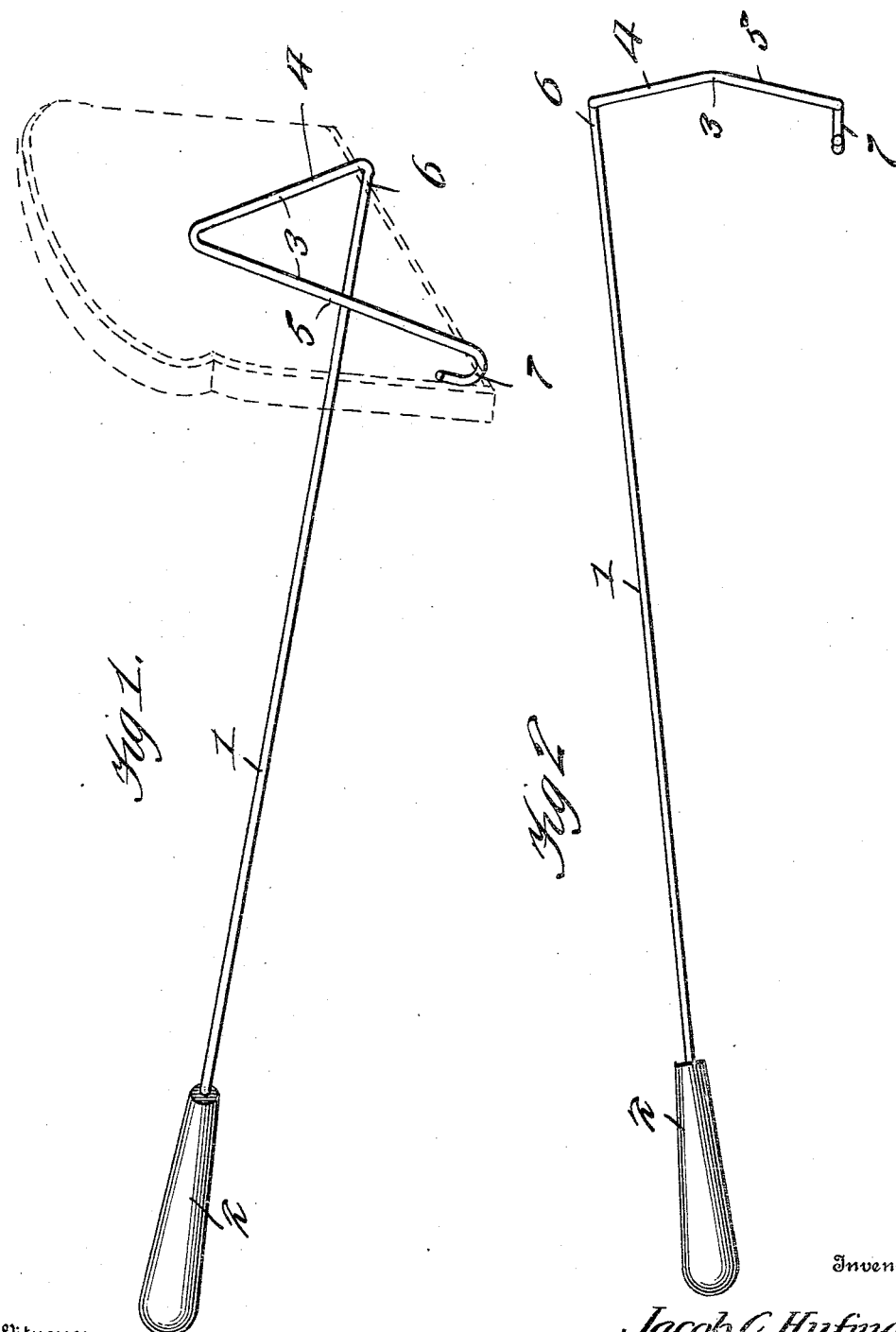

UNITED STATES PATENT OFFICE.

JACOB C. HUFMAN, OF WINONA, MINNESOTA.

TOASTER.

935,510.  Specification of Letters Patent.  Patented Sept. 28, 1909.

Application filed March 13, 1909.  Serial No. 483,191.

*To all whom it may concern:*

Be it known that I, JACOB C. HUFMAN, a citizen of the United States, residing at Winona, in the county of Winona and State of Minnesota, have invented new and useful Improvements in Toasters, of which the following is a specification.

This invention relates to a toaster or device for holding a slice of bread while it is being toasted, the object of the invention being to provide a simple, cheap and effective device of this character by which a slice of bread may be held over a hot stove or fire without liability of scorching the hand, by which the slice of bread may be held without liability of breaking it, and by which but a small supporting surface will be presented to bear upon the bread, thus enabling the latter to be evenly or uniformly toasted.

The invention is illustrated in the accompanying drawing, in which,

Figure 1 is a perspective view of the improved toaster, illustrating its mode of use in holding a slice of bread, the latter appearing in dotted lines. Fig. 2 is a top plan view of the toaster disposed in the operative position shown in Fig. 1.

The toaster is made mainly from a single piece of wire, which has an elongated straight portion forming a stem or shank 1, at the rear end of which is provided a suitable handle 2, composed of wood or other suitable material. At the forward end of the stem or shank the wire is bent to provide an upwardly and laterally extending supporting member 3, which, as shown, is preferably of inverted V-form and embodies inner and outer upwardly converging arms 4 and 5 connected at their upper ends. This support is formed by bending the wire at its free end into the described shape, the arm 4 being integral at its lower end with the forward end of the stem 1, and extending upwardly and laterally in one direction, while the arm 5 projects downwardly and laterally from the upper end of the arm 4 with its lower end terminating in the plane of the stem.

The slice of bread to be toasted is supported against displacement by the support 3 and rests at its lower edge against a supporting surface 6 formed by the forward end of the stem 1 adjacent its juncture with the arm 4 and within the space between the lower end of the arm 5 and an upwardly projecting supporting hook 7 formed thereon, the support operating to hold the bread against any possibility, under ordinary manipulation of displacement. If desired, the hook 7 may be forced into the bread to insure its firm retention in position, and the support 3 may be given a slight degree of forward inclination, as shown in order to dispose the slice horizontally when the toaster is held at an inclination to the horizontal.

A toaster embodying my invention is simple and cheap in construction and by its use a slice of bread may be held securely over a hot stove, flame or fire without liability of the hand of the operator becoming scorched. Owing to the small size or extent of the bearing surfaces of the support on the slice of bread, but a very small proportion of the latter will be shielded from the heat, so that the bread may be evenly or uniformly toasted.

Having thus described the invention what is claimed as new is:—

A toaster comprising a stem formed of wire and having a handle at one end, and a supporting element at its opposite end, said supporting element being formed by the free end of the wire by bending the same outwardly and laterally into an inverted V-shape, the forward portion of the stem being arranged to serve as a rest at the base of the inner arm of said supporting member and the free end of the latter being provided with an upturned hook.

In testimony whereof I affix my signature in presence of two witnesses.

JACOB C. HUFMAN.

Witnesses:
TIMOTHY SHEEHAN,
FRANCES HUFMAN.